US00RE46748E

(19) United States
(12) Reissued Patent
Gaponenko et al.

(10) Patent Number: US RE46,748 E
(45) Date of Reissued Patent: Mar. 6, 2018

(54) CONVERTING IMAGES IN VIRTUAL ENVIRONMENTS

(71) Applicant: IBM Corporation, Armonk, NY (US)

(72) Inventors: Yulia Gaponenko, Moscow (RU); Alexey Miroshkin, Moscow (RU); Indrajit Poddar, Sewickly, PA (US); Vladislav B. Ponomarev, Voronezh (RU); Igor Sukharev, Moscow (RU)

(73) Assignee: International Business Machines Corporation, Armonk, NY (US)

(21) Appl. No.: 14/202,186

(22) Filed: Mar. 10, 2014

Related U.S. Patent Documents

Reissue of:
(64) Patent No.: 8,352,415
Issued: Jan. 8, 2013
Appl. No.: 12/816,117
Filed: Jun. 15, 2010

(51) Int. Cl.
*G06F 17/30* (2006.01)
*G06F 9/445* (2018.01)
*G06F 9/455* (2018.01)

(52) U.S. Cl.
CPC ..... *G06F 8/63* (2013.01); *G06F 9/45558* (2013.01); *G06F 2009/45562* (2013.01)

(58) Field of Classification Search
CPC ..... G06F 8/63; G06F 9/45558; G06F 2009/45562; G06F 2009/4557
USPC .... 707/602, 610, 635, 756, 809, 831; 718/1; 717/120, 168–178
See application file for complete search history.

(56) References Cited

U.S. PATENT DOCUMENTS 5,586,304 A * 12/1996 Stupek, Jr. ..... G06F 8/68 707/999.201
5,848,415 A * 12/1998 Guck ..... 707/831
6,058,397 A * 5/2000 Barrus et al.
6,714,980 B1 * 3/2004 Markson et al. ..... 709/226
(Continued)

FOREIGN PATENT DOCUMENTS

WO 2005088539 A2 9/2005

OTHER PUBLICATIONS

Tip et al, "Practical Extraction Techniques for Java," ACM Transactions on Programming Languages and Systems, vol. 24, No. 6, Nov. 2002, pp. 625-666.

(Continued)

*Primary Examiner* — Adam L Basehoar
(74) *Attorney, Agent, or Firm* — Jeffrey S. LaBaw; David H. Judson

(57) ABSTRACT

The different illustrative embodiments provide a method, computer program product, and apparatus for converting a first image for a virtual machine formatted for a first virtual environment. A second image is created, wherein the second image is non-specific to any virtual environment. A determination is made whether a portion of files to be copied from the first virtual image to the second virtual image should be replaced using a compatibility matrix, wherein the compatibility matrix identifies changes between the first virtual environment and a second virtual environment. A replacement for the portion of the files is copied to the second image using the compatibility matrix responsive to a determination that the portion of the files in the set of files should be (Continued)

replaced. The file is copied to the second image responsive to an absence of a determination that the each file in the set of files should be replaced.

23 Claims, 6 Drawing Sheets

(56) References Cited

U.S. PATENT DOCUMENTS 6,751,795 B1 * 6/2004 Nakamura ..... G06F 8/68 717/174
6,760,804 B1 * 7/2004 Hunt et al. ..... 710/313
6,898,768 B1 * 5/2005 Theodossy et al. ..... 716/111
7,002,976 B2 * 2/2006 Dupont ..... 370/404
7,006,494 B1 * 2/2006 Tighe et al. ..... 370/389
7,092,958 B2 * 8/2006 Hempstead et al. ..... 706/50
7,155,504 B1 * 12/2006 Fujieda ..... 709/224
7,227,837 B1 * 6/2007 Bi et al. ..... 370/217
7,283,533 B1 * 10/2007 Kumar et al. ..... 370/395.52
7,328,434 B2 * 2/2008 Swanson ..... G06F 8/665 709/220
7,356,679 B1 * 4/2008 Le et al. ..... 713/1
7,363,654 B1 * 4/2008 Yamada ..... 726/15
7,383,327 B1 6/2008 Tormasov et al.
7,383,541 B1 * 6/2008 Banks ..... G06F 8/65 717/126
7,415,706 B1 * 8/2008 Raju ..... G06F 9/44536 717/170
7,440,894 B2 * 10/2008 Zhou et al. ..... 704/243
7,536,541 B2 * 5/2009 Isaacson ..... 713/2
7,577,722 B1 * 8/2009 Khandekar et al. ..... 709/220
7,587,570 B2 * 9/2009 Sarkar et al. ..... 711/170
7,633,955 B1 12/2009 Saraiya et al.
7,814,495 B1 * 10/2010 Lim et al. ..... 718/104
7,865,663 B1 * 1/2011 Nelson et al. ..... 711/112
8,181,174 B2 * 5/2012 Liu ..... G06F 9/44505 717/121
8,352,608 B1 * 1/2013 Keagy et al. ..... 709/226
8,498,997 B2 * 7/2013 Murase ..... 707/764
8,584,121 B2 * 11/2013 Arcese et al. ..... 718/1
9,052,966 B1 * 6/2015 Quinlan ..... G06F 8/51
2002/0170052 A1 * 11/2002 Radatti ..... G06F 21/564 717/171
2003/0037184 A1 * 2/2003 Day et al. ..... 710/1
2004/0059829 A1 * 3/2004 Chu et al. ..... 709/238
2006/0101116 A1 * 5/2006 Rittman et al. ..... 709/204
2007/0010796 A1 * 1/2007 Moran et al. ..... 604/523
2007/0168478 A1 * 7/2007 Crosbie ..... 709/221
2008/0114830 A1 * 5/2008 Welingkar et al. ..... 709/203
2008/0256530 A1 * 10/2008 Armstrong ..... G06F 9/45533 717/174
2008/0263258 A1 * 10/2008 Allwell et al. ..... 711/6
2009/0006534 A1 * 1/2009 Fries et al. ..... 709/203
2009/0007105 A1 * 1/2009 Fries et al. ..... 718/1
2009/0013092 A1 * 1/2009 Pao et al. ..... 709/250
2009/0070771 A1 * 3/2009 Yuyitung et al. ..... 718/105
2009/0150802 A1 * 6/2009 Do et al. ..... 715/757
2010/0043046 A1 * 2/2010 Sen et al. ..... 725/133
2010/0088699 A1 * 4/2010 Sasaki ..... 718/1
2010/0107163 A1 * 4/2010 Lee ..... 718/1
2010/0306355 A1 * 12/2010 Lagergren et al. ..... 709/222
2011/0035754 A1 * 2/2011 Srinivasan ..... 718/105
2011/0131573 A1 * 6/2011 Antony ..... 718/1
2011/0153515 A1 * 6/2011 Pitzo et al. ..... 705/342
2011/0231839 A1 * 9/2011 Bennett ..... G06F 9/5055 718/1
2011/0313982 A1 * 12/2011 Kranendonk et al. ..... 707/702
2012/0140772 A1 * 6/2012 Chu et al. ..... 370/392
2013/0227089 A1 * 8/2013 McLeod et al. ..... 709/220
2013/0227551 A1 * 8/2013 Tsirkin ..... 718/1
2014/0201146 A1 * 7/2014 Kapsiar ..... G06F 17/30079 707/635

OTHER PUBLICATIONS

Hartel, "Formalizing the Safety of Java, the Java Virtual machine, and Java Card," ACM Computing Surveys, vol. 33, No. 4, Dec. 2001, pp. 517-558.

"Method and Practice for Achieving High Availability of Virtual Machines Based on Normalized Image Formats and Mobility Protocols," IBM Technical Disclosure, Mar. 27, 2009, IPCOM000181285D, pp. 1-3.

* cited by examiner

CONVERTING IMAGES IN VIRTUAL ENVIRONMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field

The disclosure relates generally to an improved data processing system and more specifically to virtual environments. Even more specifically, the disclosure relates to images running on virtual machines in virtual environments.

2. Description of the Related Art

Virtual environments are commonly used in data processing systems. A virtual environment is software that runs a set of virtual machines on a set of data processing systems. A virtual machine is a collection of virtual hardware on which other software is run. The other software commonly includes an operating system. The virtual environment causes the data processing system to run commands sent by the other software to the virtual hardware on real-world hardware associated with the data processing system. Examples of virtual environments include Amazon EC2 by Amazon.com, Inc. in Seattle, Wash., VMWare ESXi by VMWare, Inc. in Palo Alto, Calif., and Microsoft Hyper-V by Microsoft, Inc. in Redmond, Wash.

The virtual environment causes the data processing system to run the commands differently, depending on the virtual hardware being accessed by the software running on the virtual machine. For example, commands to perform a calculation on a virtual processor are typically sent to the real-world processor to be performed. However, commands to store data on a virtual hard drive are typically stored in a set of files stored on a set of real-world disks. Each of the set of files may represent an entire drive for the virtual machine.

It is often desirable to convert a virtual machine from one virtual environment to another. For example, a company may convert a virtual machine running on Amazon EC2 to a virtual machine running on VMWare ESXi. Each virtual environment may have an image type for the virtual hard drive specific to the type of virtual environment. For example, a virtual hard drive used by Amazon EC2 may not be usable by VMWare ESXi. Additionally, each virtual environment may use different virtual hardware. A different device driver may be used to communicate with the different virtual hardware. Configuration settings may also vary between the virtual environments, such as network configuration settings.

Because of the differences in virtual environments, the process for converting between virtual environments typically involves creating a virtual machine in the new virtual environment and starting both the virtual machine in the new virtual environment and the virtual machine in the old virtual environment. The user then installs the desired operating system on the new virtual machine, installs the proper device drivers for the new virtual environment, and copies data from the old virtual machine to the new virtual machine.

SUMMARY

A method, computer program product, and apparatus are presented for converting a first image for a virtual machine formatted for a first virtual environment. A second image is created, wherein the second image is non-specific to any virtual environment. A determination is made whether a portion of files to be copied from the first virtual image to the second virtual image should be replaced using a compatibility matrix, wherein the compatibility matrix identifies changes between the first virtual environment and a second virtual environment. A replacement for the portion of the files is copied to the second image using the compatibility matrix responsive to a determination that the portion of the files in the set of files should be replaced. The file is copied to the second image responsive to an absence of a determination that the each file in the set of files should be replaced.

DETAILED DESCRIPTION

Figure 1:
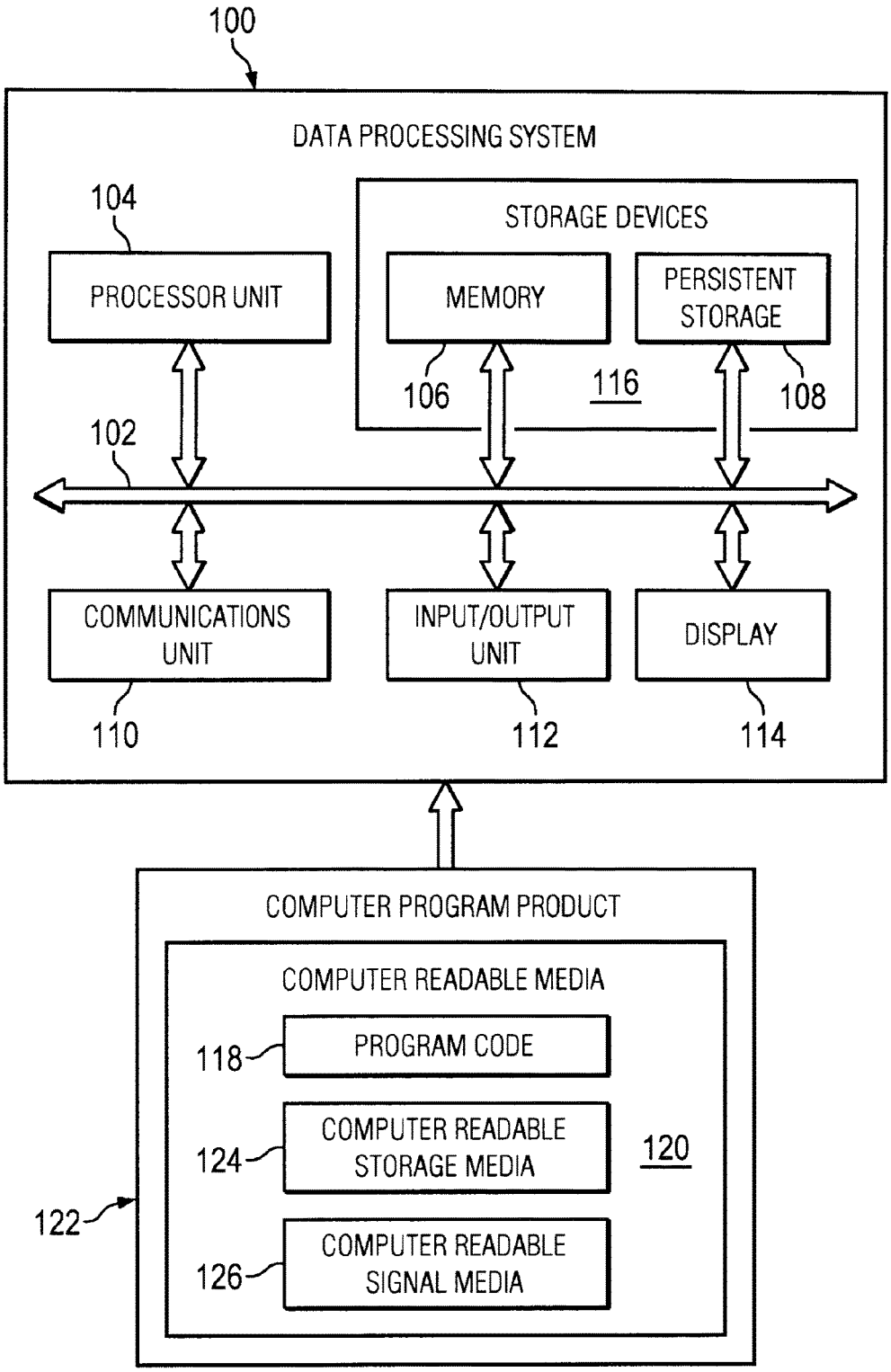
FIG. 1 depicts an illustration of a data processing system in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of processors, a multi-processor core, or some other type of processor, depending on the particular implementation. A "number", as used herein with reference to an item, means "one or more items". Further, processor unit 104 may be implemented using a set of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

Data processing system 100 may be used to convert a virtual image from one virtual environment to another virtual environment. For example, a virtual image may be stored in persistent storage 108. Processor unit 104 may run program code 118 and create a second virtual image in persistent storage 108. The first virtual image may be loaded, at least in part, into memory 106 for the conversion. Processor unit 104 may locate a compatibility matrix in persistent storage 108 for use during the conversion. Alternatively, data processing system 100 may receive part or all of the compatibility matrix using communications unit 110. For example, part or all of the compatibility matrix may be received over a network.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

The different illustrative embodiments recognize and take into account several considerations. For example, the different illustrative embodiments recognize that starting virtual machines and reinstalling operating systems to convert virtual machines from one virtual environment to another is time intensive. Additionally, user error may occur in installation of device drivers or configuration of operating system settings in the new virtual machine.

The different illustrative embodiments also recognize and take into account that converting the virtual machine from one virtual environment to another virtual environment may be performed while the virtual machine is offline. A virtual machine is offline when the virtual machine is not running in a hypervisor. When the virtual machine is offline, the virtual machine is represented in the form of a virtual image on a physical disk.

Additionally, a compatibility matrix may be used to identify files that should be replaced while the contents of the old virtual machine are copied to the new virtual machine. The configuration settings, device drivers, and other software may be installed or configured during the conversion that ensures that conversions of virtual machines are performed consistently, regardless of the user performing the conversion.

Thus, the different illustrative embodiments provide a method, computer program product, and apparatus for converting a first image for a virtual machine formatted for a first virtual environment. A second image is created, wherein the second image is non-specific to any virtual environment. A determination is made whether a portion of files to be copied from the first virtual image to the second virtual image should be replaced using a compatibility matrix, wherein the compatibility matrix identifies changes between the first virtual environment and a second virtual environment. A replacement for the portion of the files is copied to the second image using the compatibility matrix responsive to a determination that the portion of the files in the set of files should be replaced. The file is copied to the second image responsive to an absence of a determination that the each file in the set of files should be replaced.

Figure 2:
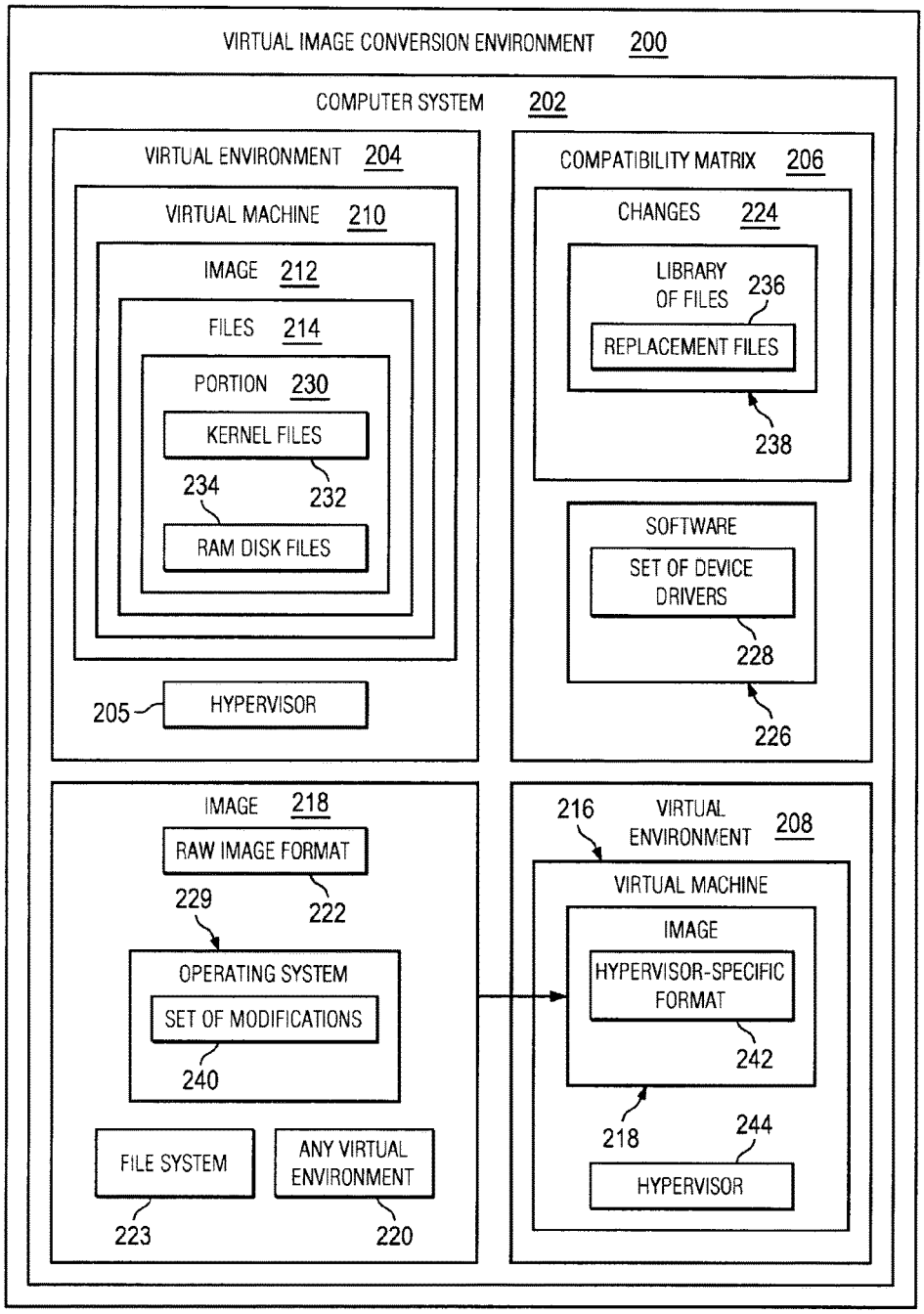
FIG. 2 depicts an illustration of a virtual image conversion environment in accordance with an illustrative embodiment.

Turning now to FIG. 2, an illustration of a virtual image conversion environment is depicted in accordance with an illustrative embodiment. Virtual image conversion environment 200 may be implemented in a set of computer systems. For example, virtual image conversion environment 200 may be implemented in one computer system, such as data processing system 100 in FIG. 1. Alternatively, components of virtual image conversion environment 200 may be located in a set of computer systems. In these examples, virtual image conversion environment 200 is implemented in computer system 202.

Computer system 202 is a data processing system, such as data processing system 100 in FIG. 1. Computer system 202 contains virtual environment 204, compatibility matrix 206, virtual environment 208, and image 218.

Virtual environment 204 is software that runs on computer system 202. Virtual environment 204 causes computer system 202 to run commands sent by virtual machine 210 on hardware associated with computer system 202. For example, virtual environment 204 may send and receive network communications using real world hardware associated with computer system 202 on behalf of virtual machine 210. In this way, virtual environment 204 runs as an intermediary between computer system 202 and virtual machine 210. In these examples, virtual environment 204 is hypervisor 205. Of course, in some illustrative embodiments, virtual environment 204 may contain multiple hypervisors 205. For example, virtual environment 204 may contain multiple hypervisors 205 when virtual environment 204 is running on multiple computer systems configured to share processing operations among the computer systems, such as a cloud environment.

Virtual machine 210 is a collection of virtual hardware on which other software is run. For example, virtual machine 210 has a virtual processor that runs an operating system. Virtual machine 210 also may have one or more virtual hard disk. The virtual hard disk stores and retrieves data as requested by software running on virtual machine 210. However, the virtual hard disks are stored on a physical disk associated with computer system 202 in the form of image 212. Image 212 is a file on the physical disk associated with computer system 202 that contains all data virtual machine 210 stores on a virtual hard disk.

Image 212 contains files 214. Files 214 are files that are stored in a file system by virtual machine 210 in response to instructions from software running on virtual machine 210. Files 214 may include, for example, operating system files, data files, or other suitable files. Other examples of files 214 are executable programs, such as operating system binaries, and device drivers.

In these examples, computer system 202 receives an input to convert virtual machine 210 running in virtual environment 204 to virtual machine 216 running on virtual environment 208. Virtual environment 208 is a virtual environment like virtual environment 204 such that virtual environment 208 and virtual environment 204 have the same hardware architecture, memory address space size for binaries running in virtual environments 208 and 204, and type and version of operating system of virtual machines 210 and 216, respectively. Hardware architecture is the design of the processor being used. For example, the hardware architecture may be x86. Memory address space size is the size of the space that may be used by the application in memory. For example, the memory address space size may be 32-bit. However, virtual environment 208 uses a different image format, file system layout, operating system configuration settings, and device drivers than virtual environment 204. For example, virtual environment 204 may be Amazon EC2, and virtual environment 208 may be VMWare ESXi. The input may be a user input.

Computer system 202 creates image 218. Image 218 is a virtual hard disk image that is not specific to any virtual environment 220. Image 218 begins as a blank image. For example, image 218 may be a blank virtual hard disk image in raw image format 222. Raw image format 222 is a format in which data is divided into sectors and stored in the image.

Once image 218 is created, computer system 202 processes compatibility matrix 206. Compatibility matrix 206 is a data source that describes the modifications to be made to an image configured to run on a virtual machine in one virtual environment to use the image in another virtual machine in another virtual environment.

Compatibility matrix 206 describes configuration of file system 223 used by virtual environment 208. For example, in an illustrative environment in which virtual environment 208 is Amazon EC2, compatibility matrix 206 describes file system 223 to be created in image 218 such that image 218 contains three partitions: a root partition, a storage partition, and a swap partition. Computer system 202 configures image 218 for use in virtual environment 208 by creating file system 223 according to the description in compatibility matrix 206 with respect to the type of virtual environment 208.

Compatibility matrix 206 also describes changes 224 to be made while copying image 212 to image 218 such that image 218 is usable on virtual machine 216 running in virtual environment 208. Changes 224 are replacement files 236 that are copied to image 218 instead of portion 230 of files 214. Portion 230 is a set of files described in compatibility matrix 206 as being incompatible and/or unusable with virtual machine 216 running in virtual environment 208. Replacement files 236 may be located in library of files 238. Library of files 238 is a collection of replacement files 236. The collection may be divided in a set of different ways. For example, collection of replacement files 236 may be divided by the particular operating system, virtual environment with which the files are compatible, and/or other suitable factors. Library of files 238 takes the form of a folder hierarchy in one illustrative embodiment.

Compatibility matrix 206 also describes software 226 to be installed on image 218 such that image 218 is usable in virtual machine 216. For example, software 226 may consist of set of device drivers 228 for virtual hardware on virtual machine 216. In one illustrative embodiment, set of device drivers 228 consists of a display driver and a network interface card driver.

Once computer system 202 identifies changes 224, and software 226, computer system 202 begins copying files 214 to image 218. Some of files 214 make up operating system 229. Operating system 229 is software that runs on virtual machine 210 or virtual machine 216 to allow other software to communicate with the virtual hardware of virtual machine 210 or virtual machine 216. For example, operating system 229 may be Fedora Linux.

While computer system 202 copies files 214, computer system 202 also processes changes 224. Computer system 202 processes changes 224 by not copying portion 230 of files 214 identified in compatibility matrix 206. Instead, computer system 202 stores replacement files 236 in image 218 in place of portion 230.

Replacement files 236 are a set of files that are specific to virtual environment 208. In other words, replacement files 236 are used when running image 218 on virtual machine 216 to allow image 218 to be usable by virtual machine 216.

In these examples, portion 230 consists of kernel files 232 and ram disk files 234. Kernel files 232 are files used by an operating system, such as operating system 229, to communicate with virtual hardware, such as the virtual hardware of virtual machine 216. Ramdisk files 234 are files loaded into the virtual main memory of virtual machine 216 during the startup process of virtual machine 216. Of course, kernel files 232 and ramdisk files 234 are merely examples of types of files that may be replaced using portion 320 and replacement files 236. In other illustrative embodiments, other types of files may be replaced using portion 320 and replacement files 236.

Once copying of files 214 is complete, computer system 202 then installs software 226 onto image 218. Software 226 consists of set of device drivers 228 in these examples. Set of device drivers 228 are software that describes how operating system 229 may communicate with virtual hardware in virtual machine 216. For example, set of device drivers 228 may consist of a display driver, a network driver, an input device driver, other suitable device drivers. Of course, computer system 202 may also install software 226 during the copying process.

Computer system 202 then performs set of modifications 240 to operating system 229. Set of modifications 240 are changes to configuration settings that allow operating system 229 to be configured for virtual machine 216 in virtual environment 208. In other words, set of modifications 240 are changes to system configuration settings that are specific to the virtual hardware of virtual machine 216. For example, set of modifications 240 may consist of network settings, disk configuration or layout settings, or other suitable settings.

Image 218 is now in hypervisor-specific form 242. Hypervisor-specific form 242 is a format usable by virtual environment 208. In these examples, virtual environment 208 is hypervisor 244. In some illustrative embodiments, computer system 202 then associates image 218 with virtual machine 216. For example, computer system 202 may set virtual machine 216 to use image 218 as the primary startup disk for virtual machine 216. Virtual machine 216 may then be started in virtual environment 208.

The illustration of virtual image conversion environment 200 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, virtual environment 204 may run on computer system 202, while virtual environment 208 may be run on another computer system. Additionally, portion 230 may contain other types of files described by compatibility matrix 206 than kernel files 232 and ram disk files 234. For example, portion 230 may also contain library files.

Additionally, software 226 may consist of additional software besides set of device drivers 228. For example, software 226 may also consist of network management software.

Figure 3:
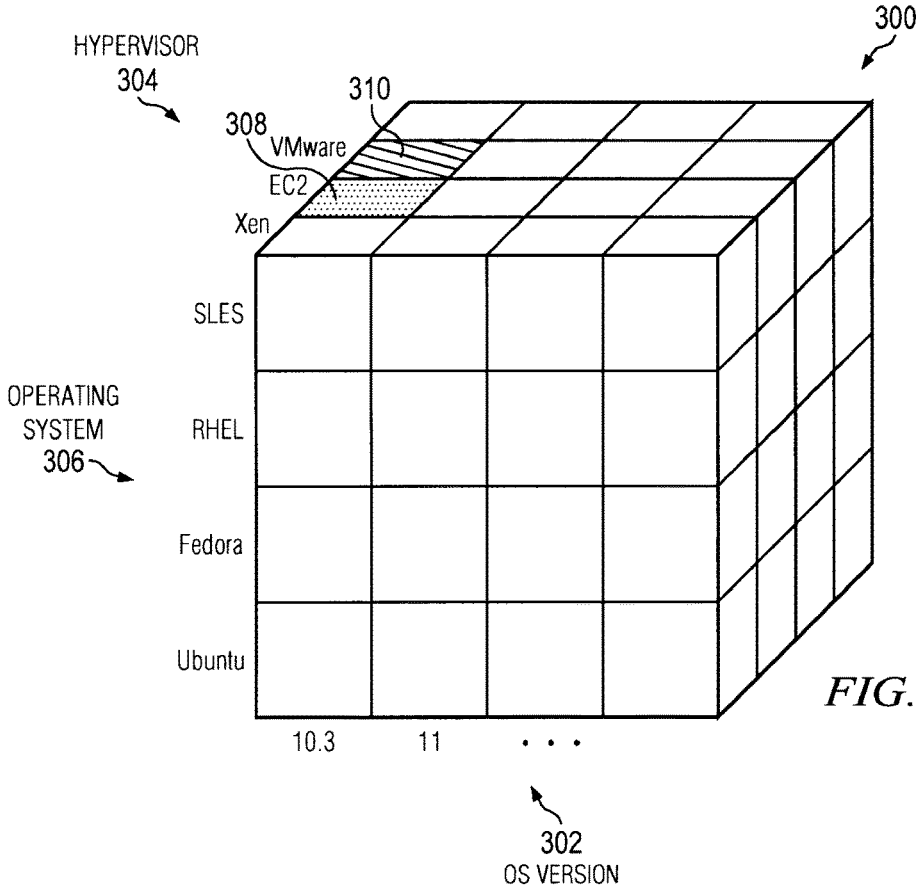
FIG. 3 depicts an illustration of a compatibility matrix in accordance with an illustrative embodiment.

Turning now to FIG. 3, an illustration of a compatibility matrix is depicted in accordance with an illustrative embodiment. Compatibility matrix 300 is an example implementation of compatibility matrix 206 in FIG. 2. Compatibility matrix 300 describes modifications that are to be performed when converting a virtual image from a particular hypervisor to another hypervisor. For example, compatibility matrix 300 may be used to describe the modifications to be performed when converting an image running Fedora Linux version 11 from VMWare ESXi to Amazon Machine Image. In these examples, compatibility matrix 300 is designed by a human operator.

Compatibility matrix 300 has three axes in this illustrative embodiment: operating system version axis 302, hypervisor axis 304, and operating system type axis 306. When a computer system converts an image from one hypervisor to another, the computer system identifies the operating system and version installed in the image running in the source hypervisor by finding the entries on operating system type axis 306 and operating system version axis 302 associated with the appropriate operating system and version. For example, the image running in the source hypervisor may have SuSE Enterprise Linux Server (SLES) 10.3 installed.

The computer system then identifies the hypervisor running the source image and the target hypervisor for the new image. The computer system uses compatibility matrix 300 to locate the entries associated with the two hypervisors that are also associated with the appropriate operating system and version. For example, assume the hypervisor running the source image is Amazon Machine Image, the operating system is SuSE Enterprise Linux Server version 10.3, and the target hypervisor is VMWare ESXi. The computer system would use compatibility matrix to identify entry 308 and entry 310. Each of entry 308 and 310 contain the appropriate files, software, and configuration settings for the respective hypervisors running the particular operating system.

Figure 4:
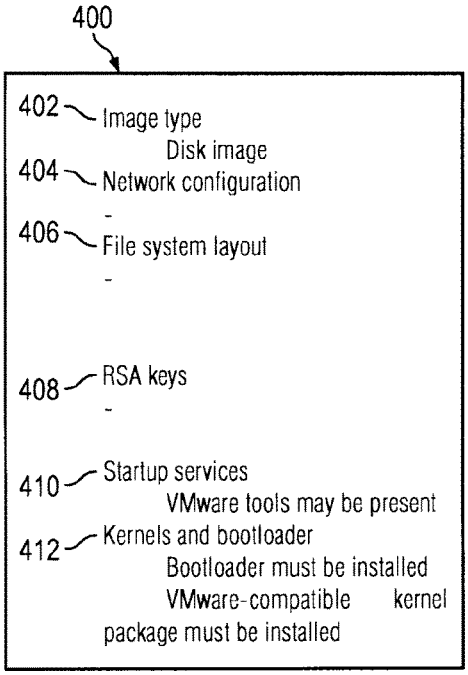
FIG. 4 depicts an illustration of a source hypervisor entry in a compatibility matrix in accordance with an illustrative embodiment.
Figure 5:
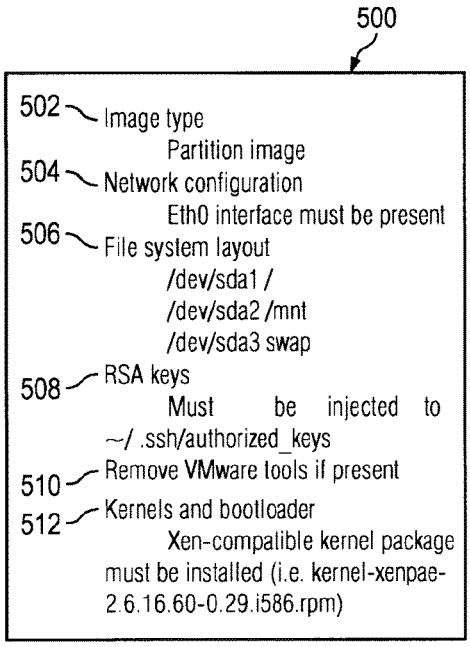
FIG. 5 depicts an illustration of a target hypervisor entry in a compatibility matrix in accordance with an illustrative embodiment.

FIGS. 4 and 5 are examples of entries 308 and 310 in compatibility matrix 300. FIGS. 4 and 5 depict examples of files, configuration settings, and drivers that are installed or copied into the new image to run the new image in the target hypervisor.

Turning now to FIG. 4, an illustration of a source hypervisor entry in a compatibility matrix is depicted in accordance with an illustrative embodiment. Source hypervisor entry 400 is an example implementation of entry 310 in FIG. 3.

Source hypervisor entry 400 describes details of the configuration of the source hypervisor image for the conversion in this illustrative embodiment. The source hypervisor is an example of virtual environment 204 in FIG. 2. Entry 402 indicates that the image type of the image to be converted is a disk image. The computer system processing source hypervisor entry 400 uses entry 402 to identify how the source image is to be loaded for the copying of data to the target image.

Entry 404 describes specifics of network configuration used by the source hypervisor. No data is stored in entry 404, so no action is performed in response to entry 404. Entry 406 describes the layout of the file system in the source hypervisor. The layout of the file system may describe mount points or drives that are used by the source hypervisor. No data is stored in entry 406, so no action is performed in response to entry 406.

Entry 408 describes the configuration of Rivest, Shamir and Adleman (RSA) keys in the source hypervisor. A hypervisor may use RSA keys stored in particular locations in order to encrypt and decrypt data stored in the image or communicated on a network. No data is stored in entry 408, so no action is performed in response to entry 408. Entry 410 describes software services that are configured to startup with the operating system on the source hypervisor. In this illustrative example, the VMWare Tools software may be present on the source image. In such an illustrative example, entry 408 may also contain instructions for removing VMWare Tools when converting an image from a source hypervisor to a target hypervisor. For example, the instructions may include files not to be copied, files to be replaced, or changes to be made to particular files.

Entry 412 describes the kernel files and ram disk files used by the source hypervisor. In this illustrative example, entry 412 describes that a ram disk and VMWare-compatible kernel files are to be installed for the source hypervisor. Entry 412 describes information used to convert an image to the hypervisor described by source hypervisor entry 400. Because source hypervisor entry 400 is directed to the source hypervisor in this illustrative example, the directives in entry 412 are ignored.

Of course, the contents of source hypervisor entry 400 are exemplary and should not be construed as limiting. Source hypervisor entry 400 may have additional entries and/or data, or fewer entries and/or less data. For example, source hypervisor entry 400 may also have an entry describing display settings used by the source hypervisor.

Turning now to FIG. 5, a target hypervisor entry in a compatibility matrix is depicted in accordance with an illustrative embodiment. Target hypervisor entry 500 is an example implementation of entry 308 in FIG. 3.

Target hypervisor entry 500 describes details of the configuration of the target hypervisor for the conversion in this illustrative embodiment. The target hypervisor is an example of virtual environment 208 in FIG. 2. Entry 502 describes the type of image used by the target hypervisor. In this illustrative example, entry 502 describes that the image is to be a partition image. A partition image is an image that contains data for only particular partitions in the virtual image. Thus, in some illustrative examples, not all partitions used in the target hypervisor are contained in the virtual image. For example, a swap partition may not be present in a virtual image when entry 502 describes that the image is to be a partition image. Prior to files being copied to the image, software installed, and modifications made, the computer system converts the raw image, such as image 218, to a partition image in accordance with entry 502.

Entry 504 indicates that the eth0 network interface is to be created in the target image. Eth0 is an identifier for a particular network adapter in the operating system. The computer system may install a set of device drivers, such as set of device drivers 228 in FIG. 2, and/or make set of modifications 240 to operating system configuration settings to create the virtual eth0 network interface.

Entry 506 describes the file system layout used by the target hypervisor. The first drive is mounted at the root of the file system ("/"). The second drive is mounted in the file system at the folder ("/mnt"), and the third drive is mounted as swap space. Swap space is disk space used as an extension of main memory when main memory is not large enough to contain the data loaded into main memory. The computer system may install a set of device drivers, such as set of device drivers 228 in FIG. 2, and/or make set of modifications 240 to operating system configuration settings to create the virtual file system described in entry 506.

Entry 508 describes the configuration of Rivest, Shamir and Adleman (RSA) keys in the source hypervisor. A hypervisor may use RSA keys stored in particular locations in order to encrypt and decrypt data stored in the image or communicated on a network. In this illustrative embodiment, the computer system will store RSA keys in the illustrated folder when converting the image for use in the target hypervisor.

Entry 510 describes the software services that are run at system startup. Since entry 510 described that VMWare tools are to be removed if present in the source image, the VMWare tools are to be removed from the image for use under the target hypervisor. Entry 512 describes the kernel files and ram disk files that are used by the operating system in the virtual machine to communicate with the virtual hardware in the virtual machine. Entry 512 describes the kernel files that are to be installed. In some illustrative embodiments, the kernel files may be located in a library of files in which particular files are associated with the combinations of operating systems, versions, and hypervisors with which they are compatible. In this illustrative embodiment, the package "kernel-xenpae-2.6.16.60-0.29.1586.rpm" is to be installed in the target image during the conversion.

Of course, the contents of target hypervisor entry 500 are exemplary and should not be construed as limiting. Target hypervisor entry 500 may have additional entries and/or data, or fewer entries and/or less data. For example, target hypervisor entry 500 may also have an entry describing display settings used by the target hypervisor.

Figure 6:
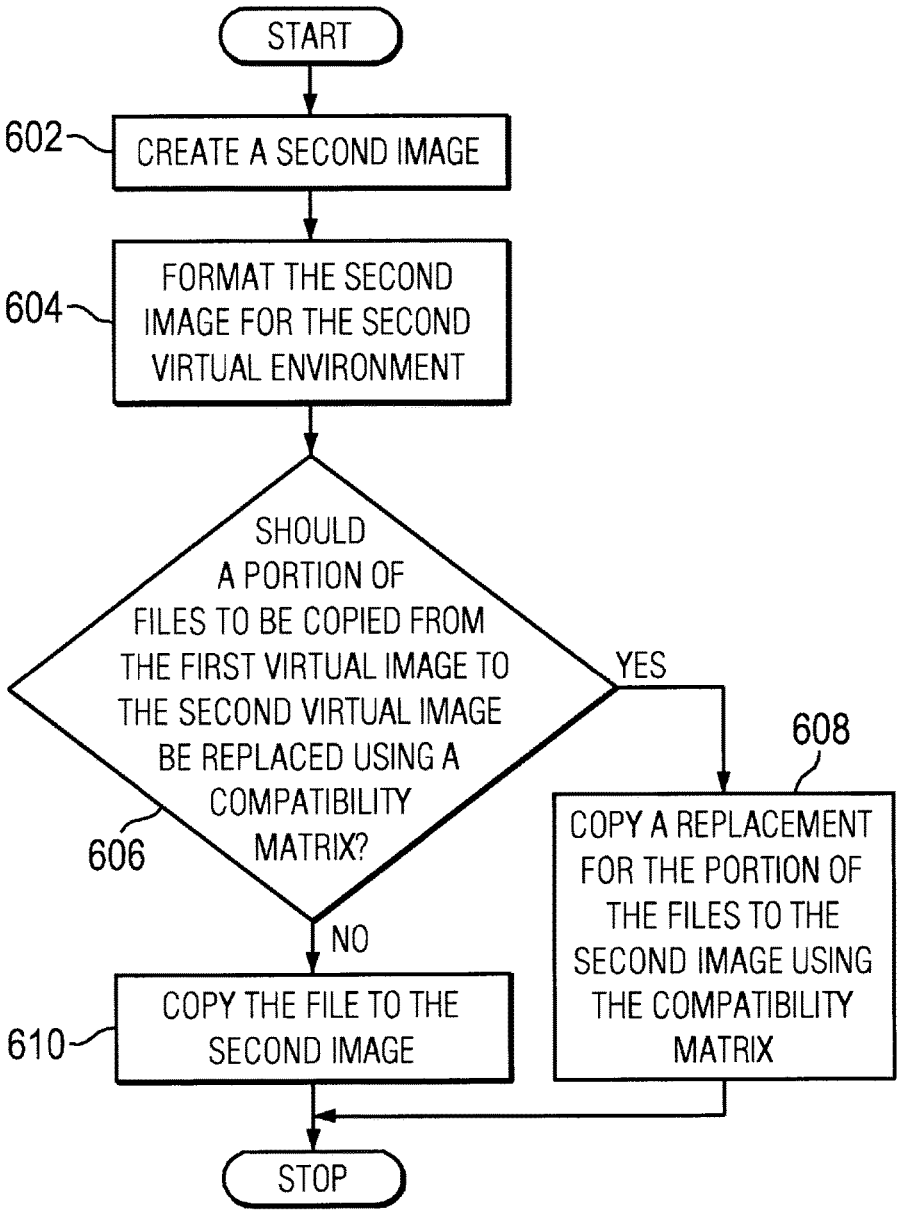
FIG. 6 depicts a flowchart of a process for converting a first image for a virtual machine formatted for a first virtual environment in accordance with an illustrative embodiment.

With reference now to FIG. 6, a process for converting a first image for a virtual machine formatted for a first virtual environment is depicted in accordance with an illustrative embodiment. The process may be implemented by computer system 202 in FIG. 2.

The process begins by creating a second image (step 602). The second image is non-specific to any virtual environment. For example, the second image may be in a raw format. The process then formats the second image for a second virtual environment (step 604). In these examples, the process formats the second image by creating a number of partitions and a file system on each partition, as described in a compatibility matrix with respect to the second virtual environment. The process then determines whether a portion of the files to be copied from the first virtual image to the second virtual image should be replaced using the compatibility matrix (step 606). The compatibility matrix identifies changes between the first virtual environment and the second virtual environment. The compatibility matrix may be compatibility matrix 300 in FIG. 3. The changes may be replacement files, modifications to the operating system in the second image, software to be installed, or other suitable changes.

If at operation 606 the process determines that the portion of the files in the set of files should be replaced, the process copies a replacement for the portion of the files to the second image using the compatibility matrix (step 608). The replacement files may be located in a library of files associated with a particular operating system, version, and virtual environment. The process determines that the portion of the files in the set of files should be replaced when the compatibility matrix describes the files that are being copied as files that are to be replaced in the second image. For example, kernel files and/or ram disk files may be files that should be replaced. The process terminates thereafter.

If at step 606 the process determines that the portion of the files in the set of files should not be replaced, the process copies the file to the second image (step 610). The process terminates thereafter.

Figure 7:
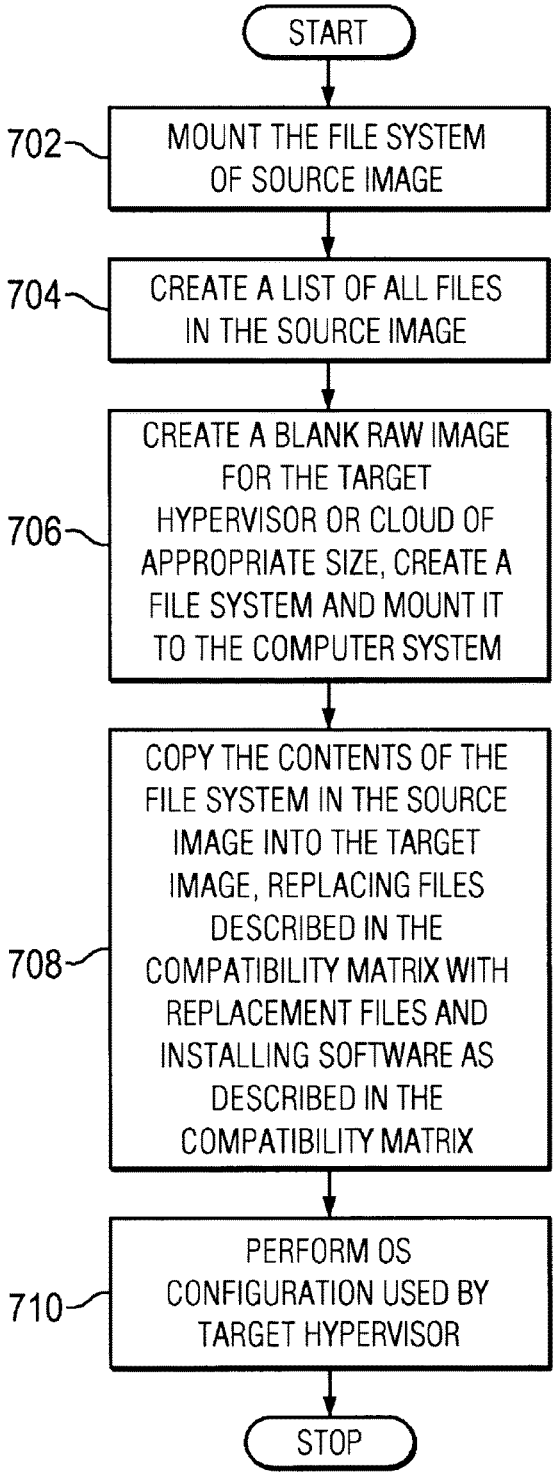
FIG. 7 depicts a flowchart of a process for converting a source image for a source virtual machine formatted for a source virtual environment to a target image for a target virtual machine formatted for a target virtual environment in accordance with an illustrative embodiment.

Turning now to FIG. 7, a flowchart of a process for converting a source image for a source virtual machine formatted for a source virtual environment to a target image for a target virtual machine formatted for a target virtual environment is depicted in accordance with an illustrative embodiment. The process may be performed by computer system 202 in FIG. 2.

The process begins by mounting the file system of the source image in the computer system (step 702). Mounting the file system of the source image makes the contents of the source image accessible to the operating system running on the computer system. The process then creates a list of all files in the source image (step 704). The process then creates a blank raw image for the target hypervisor of appropriate size, creates a file system in the raw image, and mounts the file system to the computer system (step 706). The appropriate size may be input by a user or identified based on the size of the source image. The raw image is an image format that is not specific to a particular hypervisor.

The process then copies the contents of the file system in the source image into the target image, replacing files described in the compatibility matrix with replacement files and installing software as described in the compatibility matrix (step 708). The compatibility matrix contains an entry for the operating system running on the source image for the target hypervisor. The entry describes which files are to be replaced with which files and which software and/or device drivers are to be installed. The replacement files and software/device drivers are used to allow the operating system being copied to the target image to communicate with the virtual hardware in the target hypervisor. The virtual hardware in the target hypervisor may communicate differently and operate differently than the virtual hardware in the source hypervisor.

The process then performs operating system configuration used by the target hypervisor (step 710). The operating system configuration may consist of modifying operating system settings to reflect different hypervisor configurations. For example, the network configuration may be different between the source hypervisor and the target hypervisor.

The process may also bundle the target image in the appropriate format used by the target hypervisor. For example, the process may compress the target image in accordance with the entry in the compatibility matrix for the target hypervisor. The process terminates thereafter.

The flowchart and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the process may use a format other than raw format for the image in step 706. The format may be any format usable by the computer system. Additionally, the software in step 708 may consist of additional programs, such as VMWare Tools, that allow the operating system running in the virtual machine to access the real-world hardware more directly than through the virtual machine.

Thus, the different illustrative embodiments allow an image for a virtual machine in a source virtual environment to be converted to a target virtual environment without starting a virtual machine associated with the source or target images. The compatibility matrix allows images to be converted consistently and costing less time to perform the conversion. Individuals may not even know the specifics of how to convert the image from one to another. Rather, they may simply provide the identities of the source and target hypervisors. Additionally, software components and configuration settings for the software components are preserved by the conversion. In other words, reinstallation and/or reconfiguration of the software components is not performed.

Thus, the different illustrative embodiments provide a method, computer program product, and apparatus for converting a first image for a virtual machine formatted for a first virtual environment. A second image is created, wherein the second image is non-specific to any virtual environment. A determination is made whether a portion of files to be copied from the first virtual image to the second virtual image should be replaced using a compatibility matrix, wherein the compatibility matrix identifies changes between the first virtual environment and a second virtual environment. A replacement for the portion of the files is copied to the second image using the compatibility matrix responsive to a determination that the portion of the files in the set of files should be replaced. The file is copied to the second image responsive to an absence of a determination that the each file in the set of files should be replaced.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for converting a first *virtual* image for a virtual machine formatted for a first virtual environment, the method comprising:

creating a second *virtual* image, wherein the second *virtual* image is non-specific to any virtual environment;

determining whether a portion of files *in a set of files* to be copied from the first virtual image to the second virtual image should be replaced using a compatibility matrix *to produce a determination*, wherein the compatibility matrix *comprises a set of source and target hypervisor-specific entries and that* identifies changes between the first virtual environment and a second virtual environment;

responsive to [a] *the* determination [that the portion of the files in the set of files should be replaced], *taking an action that is one of:* copying *to the second virtual image* a replacement for the portion [of the files to the second image] using the compatibility matrix *when it is determined that the portion of files in the set of files to be copied should be replaced*; and

[responsive to an absence of a determination the each file in the set of files should be replaced], copying [the] *to the second virtual image each* file [to the second image] *in the set of files to be copied that is not in the portion when it is determined that the portion of files in the set of files to be copied should not be replaced;*

*wherein at least one of the determining and copying steps is carried out in software executing in a hardware element.*

2. The method of claim 1 further comprising:

formatting the second *virtual* image for the second virtual environment prior to performing the step of determining whether the portion of the files *in a set of files* to be copied from the first virtual image to the second virtual image should be replaced using the compatibility matrix.

3. The method of claim 1 further comprising:

identifying software for the second virtual environment using the compatibility matrix; and installing the software on the second virtual image.

4. The method of claim 3, wherein the software comprises a set of device drivers.

5. The method of claim 1 further comprising:

identifying a set of modifications to be made to an operating system in the second virtual image using the compatibility matrix;

performing the set of modifications to the operating system in the second virtual image.

6. The method of claim 5, wherein the set of modifications are selected from network settings and disk configuration settings.

7. The method of claim 1, wherein the portion of the files are selected from kernel files and ramdisk files.

8. The method of claim 2, wherein the step of formatting the second virtual image further comprises:

creating a file system in the second virtual image configured for the second virtual environment using the compatibility matrix.

9. The method of claim 1, wherein the first virtual environment is a first hypervisor and the second virtual environment is a second hypervisor different from the first hypervisor.

10. A computer program product comprising:

a computer readable storage medium;

computer readable program code, stored on the computer readable storage medium, for creating a second *virtual* image, wherein the second *virtual* image is non-specific to any virtual environment;

computer readable program code, stored on the computer readable storage medium, for determining whether a portion of files *in a set of files* to be copied from [the] *a* first virtual image to the second virtual image should be replaced using a compatibility matrix *to produce a determination*, wherein the compatibility matrix *comprises a set of source and target hypervisor-specific entries and that* identifies changes between [the] *a* first virtual environment and a second virtual environment;

computer readable program code, stored on the computer readable storage medium, *responsive to the determination to take an action that is one of:*

[for] copying *to the second virtual image* a replacement for the portion [of the files to the second image] using the compatibility matrix [responsive to a determination that the portion of the files in the set of files should be replaced] *when it is determined that the portion of files in the set of files to be copied should be replaced*; and

[computer readable program code, stored on the computer readable storage medium, for] copying [the] *to the second virtual image each* file [to the second image responsive to an absence of a determination the each file in the set of files should be replaced] *in the set of files to be copied that is not in the portion when it is determined that the portion of files in the set of files to be copied should not be replaced.*

11. The computer program product of claim 10, further comprising:

computer readable program code, stored on the computer readable storage medium, for formatting the second *virtual* image for the second virtual environment prior to the computer readable program code for determining whether the portion of the files *in a set of files* to be copied from the first virtual image to the second virtual image should be replaced using the compatibility matrix.

12. The computer program product of claim 10, further comprising:

computer readable program code, stored on the computer readable storage medium, for identifying software for the second virtual environment using the compatibility matrix; and computer readable program code, stored on the computer readable storage medium, for installing the software on the second virtual image.

13. The computer program product of claim 12, wherein the software comprises a set of device drivers.

14. The computer program product of claim 10 further comprising:

computer readable program code, stored on the computer readable storage medium, for identifying a set of modifications to be made to an operating system in the second virtual image using the compatibility matrix;

computer readable program code, stored on the computer readable storage medium, for performing the set of modifications to the operating system in the second virtual image.

15. The computer program product of claim 14, wherein the set of modifications are selected from network settings and disk configuration settings.

16. The computer program product of claim 10, wherein the portion of the files are selected from kernel files and ramdisk files.

17. The computer program product of claim 11, wherein the computer readable program code for formatting the second virtual image further comprises:

computer readable program code, stored on the computer readable storage medium, for creating a file system in the second virtual image configured for the second virtual environment using the compatibility matrix.

18. An apparatus comprising:

a bus system;

a storage device connected to the bus system, wherein the storage device includes program code; and a processor unit connected to the bus system, wherein the processing unit executes the program code to create a second *virtual* image, wherein the second *virtual* image is non-specific to any virtual environment, determine whether a portion of files *in a set of files* to be copied from [the] *a* first virtual image to the second virtual image should be replaced using a compatibility matrix *to produce a determination*, wherein the compatibility matrix *comprises a set of source and target hypervisor-specific entries and that* identifies changes between [the] *a* first virtual environment and a second virtual environment, *based on the determination, take an action that is one of:* copy *to the second virtual image* a replacement for the portion [of the files to the second image] using the compatibility matrix [responsive to a determination that the portion of the files in the set of files should be replaced] *when it is determined that the portion of files in the set of files to be copied should be replaced*, and copy [the] *to the second virtual image each* file [to the second image responsive to an absence of a determination the each file in the set of files should be replaced] *in the set of files to be copied that is not in the portion when it is determined that the portion of files in the set of files to be copied should not be replaced.*

19. The apparatus of claim 18, wherein the processor unit further executes the program code to format the second *virtual* image for the second virtual environment prior to the processor unit executing the program code to determine whether the portion of the files *in a set of files* to be copied from the first virtual image to the second virtual image should be replaced using the compatibility matrix.

20. The apparatus of claim 18, wherein the processor unit further executes the program code to identify software for the second virtual environment using the compatibility matrix, and install the software on the second virtual image.

*21. The method as described in claim 1 wherein the portion is a subset of the set of files described in the compatibility matrix as being incompatible or unusable with a second virtual machine to be used to run the second virtual image in the second virtual environment.*

*22. The computer program product as described in claim 10 wherein the portion is a subset of the set of files described in the compatibility matrix as being incompatible or unusable with a second virtual machine to be used to run the second virtual image in the second virtual environment.*

*23. The apparatus as described in claim 18 wherein the portion is a subset of the set of files described in the compatibility matrix as being incompatible or unusable with a second virtual machine to be used to run the second virtual image in the second virtual environment.*

* * * * *